United States Patent [19]
Kojima et al.

[11] Patent Number: 4,902,885
[45] Date of Patent: Feb. 20, 1990

[54] PHOTOELECTRIC CONVERSION TYPE ROTATIONAL POSITION DETECTOR

[75] Inventors: Yoshikazu Kojima; Takao Yanase; Mitsuharu Nonami; Takao Chida, all of Kanagawa, Japan

[73] Assignee: Fuji Electric Co., Ltd., Kanagawa, Japan

[21] Appl. No.: 286,008

[22] Filed: Dec. 19, 1988

[30] Foreign Application Priority Data

Feb. 1, 1988 [JP] Japan .................................. 019593

[51] Int. Cl.[4] ........................................... H01J 40/14
[52] U.S. Cl. .......................... 250/211 K; 250/231 SE
[58] Field of Search ........ 250/211 K, 231 SE, 231 R, 250/237 G, 211 J; 338/15

[56] References Cited
U.S. PATENT DOCUMENTS 4,276,534 6/1981 Meyer et al. ........................... 338/15
4,283,702 8/1981 Meyer et al. .................... 250/211 K Primary Examiner—David C. Nelms
Attorney, Agent, or Firm—Finnegan, Henderson, Farabow, Garrett and Dunner

[57] ABSTRACT

A photoelectric conversion-type rotational position indicator for indicating the rotational position of a rotating body, including a light receiving member having one or more identically shaped light receiving portions made from a photoelectric converting material at predetermined spacings on the light receiving member to generate sinusoidal signals out of phase from each other, and a light shielding member operably connected to the rotating body such that the light shielding member rotates with the rotating body, the light shielding member having windows shaped with an inner curve and an outer curve such that the visible area of each light receiving portion through each of the windows varies in a sinusoidal form of one cycle as the light shielding member rotates, and means for obtaining the phased separated sinusoidal signals by connecting groups of light receiving portions in parallel or series.

6 Claims, 6 Drawing Sheets

PHOTOELECTRIC CONVERSION TYPE ROTATIONAL POSITION DETECTOR

The present invention relates to a photoelectric conversion-type rotational position detector for detecting the rotational position (i.e., angle) of a rotating object.

BACKGROUND OF THE INVENTION

Previously, a wide variety of rotational position detectors have been proposed. These detectors may be roughly divided into two groups. The first group includes optical or magnetic pulse encoders, which output detected information on rotational position in the form of pulse signals. The second group includes optical or magnetic resolvers, which convert the angular information into analog signals using a sine or cosine function.

A photoelectric conversion-type of rotational position detector has previously been proposed, and is illustrated in its essentials in FIGS. 4(a)-(e). FIG. 4(a) illustrates the primary components of the position detector. A rotating shaft 1 of a rotating body (not shown) extends concentrically through a light emitting member 2, such as a diode, and is joined to a light shielding disk 3. Light shielding disk 3 includes a light transmission window 31, which permits light from light emitting member 2 to be transmitted to a light receiving member 4 having a light receiving portion 41.

Referring to FIG. 4(a), light receiving disk 4 includes, for example, a semicircular light receiving portion 41. Light receiving disk 4 is fixedly disposed, and is spaced a predetermined distance from light shielding disk 3 to avoid contact between light emitting disk 4 and light shielding disk 3. Light transmission window 31 permits transmission of light over an area of light receiving disk 4 defined by the rotation through 180 degrees from a predetermined reference axis passing through the central axis of rotating shaft 1.

FIGS. 4(b)-(d) illustrate various transitions that occur as light shielding disk 3 rotates with respect to light receiving disk 4. In FIG. 4(b), o is a reference axis on light receiving disk 4, and $\beta$ is a reference axis on light shielding disk 3. The angle $\theta$ is the angle between the axes $\alpha$ and $\beta$ and therefore varies as light shielding disk 3 rotates, as shown in FIGS. 4(b)-(d). If counterclockwise rotation (denoted CCW in the Figures) is designated as the forward direction of light shielding disk 3, the exposed areas 41A, 41B and 41C of the light receiving portion 41 varies with the rotation of the light shielding disk 3. This area is represented by S, and increases as light shielding member 3 rotates CCW from $\theta=0$, where S=0, to $\theta=\pi$, where S is maximized. As $\theta$ increases from $\pi$ to $2\pi$, S decreases proportionally until S=0. This variation is shown graphically in FIG. 4(e).

If light receiving portion 41 is formed from a photoelectric conversion material, such as amorphous silicon, for generating an electric current in proportion to the area that is exposed to light, the output short circuit current $I_{sc}$ is generated in quantities proportional to the area S of exposed light receiving portion. This is also illustrated in FIG. 4(e). Rotational positions, measured as angles, of the rotating object can therefore be determined by measurement of the output short circuit current $I_{sc}$.

One embodiment of such a resolver is shown in FIG. 5(a). Two light receiving portions 42 and 43 are shaped such that the size of the area S viewed through a light transmitting window (not shown) of a light shielding disk is a sine function of the angle. Light receiving potions 42 and 43 are each disposed to be spatially 90 degrees out of phase from the other. Two sinusoidal outputs $I_{sc1}$ and $I_{sc2}$ are thereby obtained, having a phase difference of ninety degrees, as shown in FIG. 5(b).

FIG. 6 shows another embodiment, in which the light receiving portions are configured to obtain four sinusoidal output signals each differing in phase by ninety degrees. Light receiving portions 44E, 44F, 44G and 44H are connected respectively to $I_{sc}$ output electrodes 45E, 45F, 45G and 45H by conductors 46E, 46F, 46G and 46H, respectively, made from the same photoelectric converting material as each light receiving portion. A metal mask 47 having windows 47E, 47F, 47G and 47H corresponding to the light receiving portions is placed over the conductors to prevent the generation of electric power in the conductors by exposure to light.

Position indicators of the types described have several inherent problems. First, they require predetermined spacing between light receiving portions such that one light receiving portion is not connected to another. All light receiving portions are therefore of different shapes, and differ from each in amplitude as well as in phase. Second, the spacings as to outer light receiving portions must be made wide enough to accommodate conductors (such as 46G and 46H of the embodiment shown in FIG. 6) leading from inner light receiving portions (such as 44G and 44H). Third, when the number of light receiving portions is increased to obtain a greater number of phase differentiated output signals, the constraints just described become even more limiting.

A fourth problem associated with the previously described embodiments lies in the positional adjustment of the metal mask (such as 47 in FIG. 6). Such adjustments must be made in both the radial and circumferential directions to assure proper alignment.

Finally, the conductors (such as 46E, 46F, 46G and 46H) typically are of differing lengths. As a result the impedances introduced by such conductors differ from each other.

These problems result in difficulty in the miniaturization of photoelectric conversion-type position indicators and improvements in the efficacy of such devices.

SUMMARY OF THE INVENTION

An object of the present invention is a photoelectric conversion-type rotational position indicator that avoids the problems of the prior art.

Another object of the present invention is a photoelectronic conversion type rotational position indicator that generates accurately an electrical signal related to angular rotation.

These and other objects are achieved by a photoelectric conversion-type rotational position indicator for indicating the rotational position of a rotating body comprising a fixedly disposed light emitting member, a light receiving member fixedly disposed opposite the light emitting member, wherein the light receiving member includes m×n identically shaped light receiving portions made from a photoelectric converting material at predetermined spacings on the light receiving member, to generate n sinusoidal signals (360/(m×n)) degrees out of phase from each other, m being a positive, non-zero integer equal to the number of sinusoidal signal cycles generated per revolution of a light shielding member, n being a positive, non-zero integer equal to the number of phase separated sinusoidal signals to be generated by the light receiving portions, the identically shaped light receiving portions having disposed between a first set of two concentric circles having radii $r_1$ and $r_2$ on the light receiving member and divided circumferentially therein. The first set of circles are coaxial with the light receiving member. A light shielding member is coaxially interposed between the light emitting member and the light receiving member and is operably connected to the rotating body such that the light shielding member rotates with the rotating body. The light shielding member has m windows disposed in a region between a second set of two concentric circles having radii $r_3$ and $r_4$, such that $r_1 \geq r_3 > r_2 \geq r_4$. The second set of circles is coaxial with the light shielding member and the windows are not superimposed upon one another when viewed in a radial direction from the center of the light shielding member. Each of the windows is shaped with an inner curve and an outer curve such that the visible area of each light receiving portion through each of the windows varies in a sinusoidal form of one cycle as the light shielding member rotates through (360/M) degrees. Means are provided for obtaining the phased separated sinusoidal signals by connecting n groups of m light receiving portions in parallel or series.

BRIEF DESCRIPTION OF THE DRAWINGS

The manner in which the above objects and other objects, features, and advantages of the present invention will become apparent from the following detailed description when it is considered in view of the drawings, wherein:

FIG. 1(a) is a view from above with the light shielding member superimposed upon the light receiving member, FIG. 1(b) shows the light shielding member.

FIG. 2(a) is a view from above with the light shielding member superimposed upon the light receiving member, FIG. 2(b) shows the light shielding member, and FIG. 2(c) shows the light receiving member;

FIG. 3(a) is a view from above with the light shielding member superimposed upon the light receiving member, FIG. 3(b) shows the light shielding member, and FIG. 3(c) shows the light receiving member;

DETAILED DESCRIPTION OF THE INVENTION

Figure 1A:
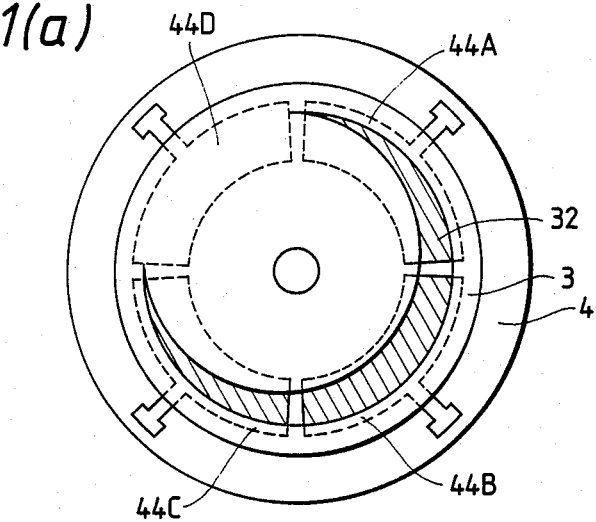
FIGS. 1(a), 1(b) and (c) (collectively referred to as FIG. 1) are views of one embodiment of the photoelectric conversion-type rotational position indicator of the present invention.

Referring now to the drawings, a fixed light emitting member (not shown), such as a diode, is provided opposite a fixed light receiving member 4. Light receiving member 4, illustrated in FIG. 1(c), includes m×n identically shaped light receiving portions 44 made from a photoelectric converting material for generating electric current or voltage proportional to the area of light receiving portion exposed to light. In the embodiment shown in the figures, the product m×n is 4, and the light receiving portions are labelled 44A, 44B, 44C and 44D. The quantity m is a positive, non-zero integer equal to the number of sinusoidal signal cycles generated per revolution of a light shielding member according to the present invention, discussed below. The quantity n is also a positive, non-zero integer equal to the number of phase separated sinusoidal signals to be generated by light receiving portions 44. In the embodiments shown in FIGS. 1–3, m=1 and n=4.

Light receiving portions 44 according to the present invention are identically shaped and are sized according to angular measurement. Referring to FIG. 1(c), each light receiving portion, e.g., 44A, according to the present invention, is described by equiangular arcs on concentric circles of radii $r_1$ and $r_2$, the arcs having angular measurement a. The light receiving portions 44 is formed between the concentric circles. The light receiving portions are separated from each other by spaces of angular measurement c along the same concentric circles of radii $r_1$ and $r_2$. These circles are coaxial with light receiving member 4. From this, it follows that the relationship between a and c is described by Formula (I):

$$a \leq (360/(m \times n)) - c \qquad (I)$$

Formula (I) sets a condition for disposing (m×n) light receiving portions 44 of identical shape on light receiving member 4.

Light receiving member 4 also includes electrodes 45 (i.e., 45A, 45B, 45C and 45D) for transmitting signal current $I_{sc}$ generated by each of the light receiving portions 44. The electrodes 45 are connected to each light receiving portion 44 by conductors 46 (i.e., 46A, 46B, 46C and 46D), which may be made of the same photoelectric converting material as light receiving portions 44 and which may be pattern wired.

Figure 1B:
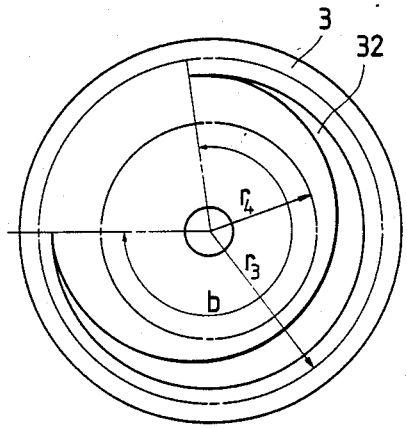
Figure 1C:
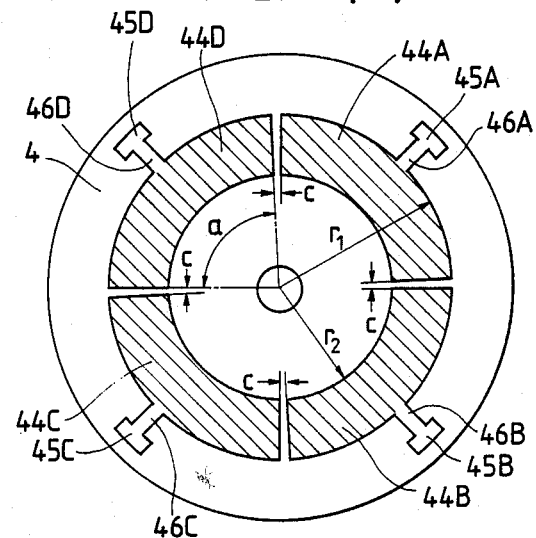
FIG. 1(c) shows the light receiving member.
Figure 2A:
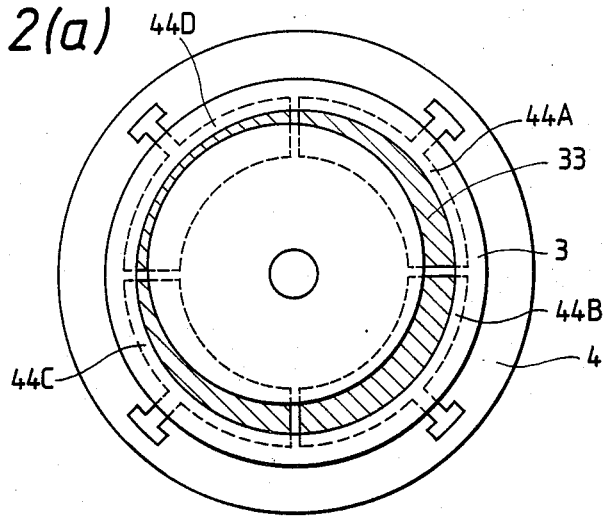
FIGS. 2(a), 2(b) and 2(c) (collectively referred to as FIG. 2) are views of an alternative embodiment of the photoelectric conversion-type rotational position indicator of the present invention.
Figure 2B:
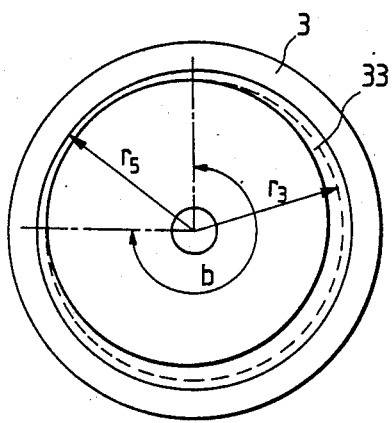
Figure 2C:
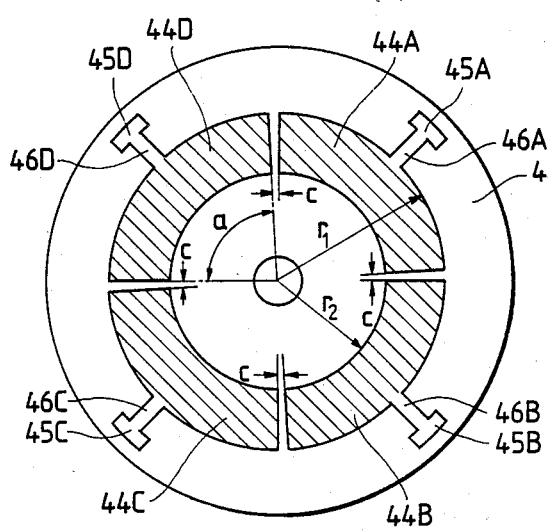
Figure 3A:
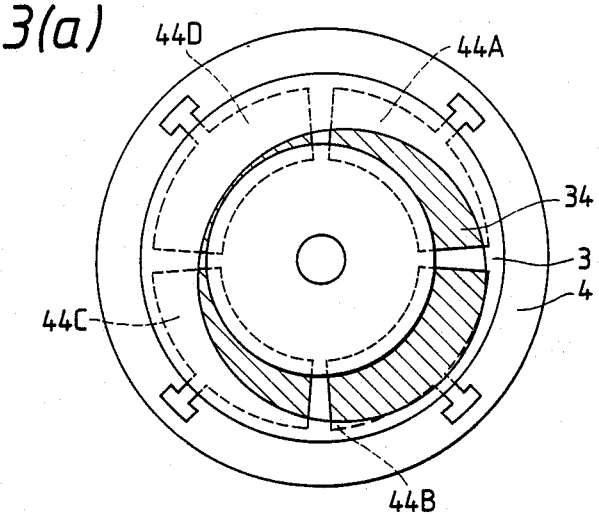
FIGS. 3(a), 3(b) and 3(c) (collectively referred to as FIG. 3) are views of another alternative embodiment of the photoelectric conversion-type rotational position indicator of the present invention.
Figure 3B:
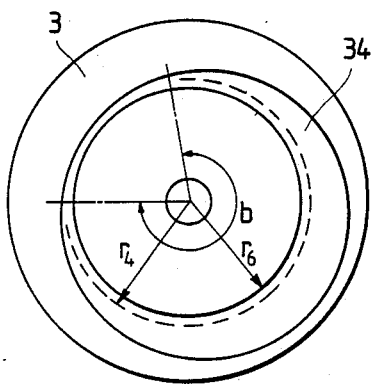
Figure 3C:
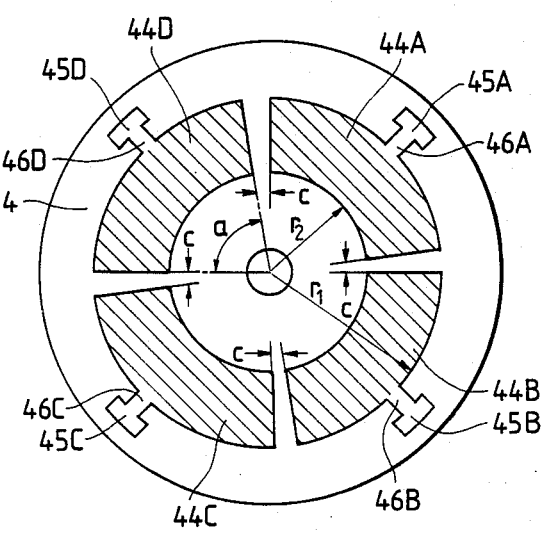
Figure 4A:
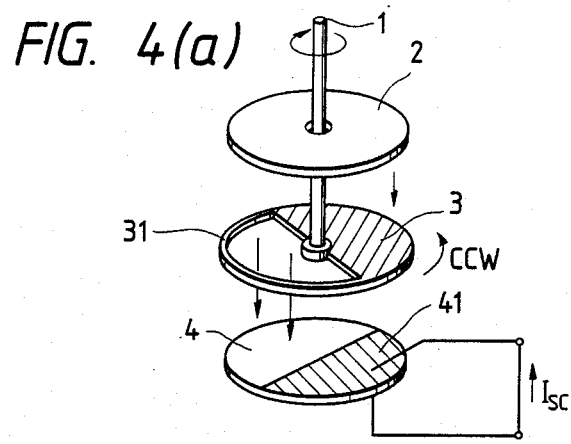
FIG. 4(a) is a view of the primary components of a photoelectric conversion-type rotational position indicator as known in the art.
Figure 4B:
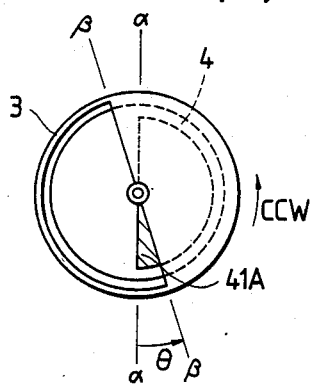
FIGS. 4(b), 4(c) and 4(d) show the operation of components of the photoelectric conversion-type rotational position indicator of FIG. 4(a) as the light shielding disk rotates counterclockwise through an angle $\theta$.
Figure 4C:
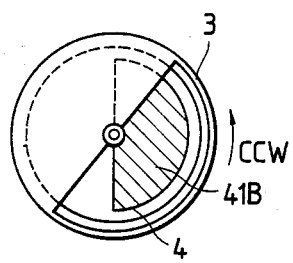
Figure 4D:
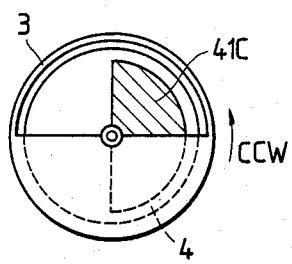
Figure 4E:
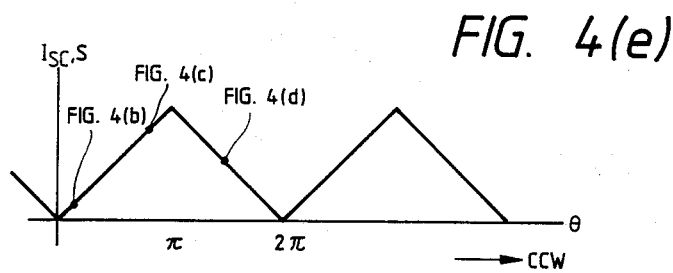
FIG. 4(e) is a graphic representation of the signal $I_{sc}$ generated by the light receiving portion of the embodiments shown in FIGS. 4(a)–(d), with marks indicating the output corresponding to the positions indicated in FIGS. 4(b)–(d)
Figure 5A:
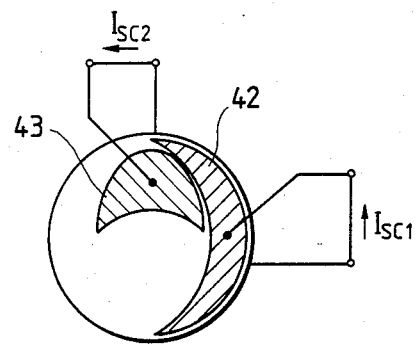
FIG. 5(a) is a view of an alternative embodiment of the light receiving disk and light receiving portions known in the art.
Figure 5B:
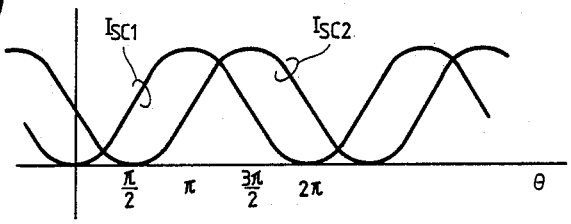
FIG. 5(b) is a graphic representation of the outputs of signals generated by the embodiment shown in FIG. 5(a)
Figure 6:
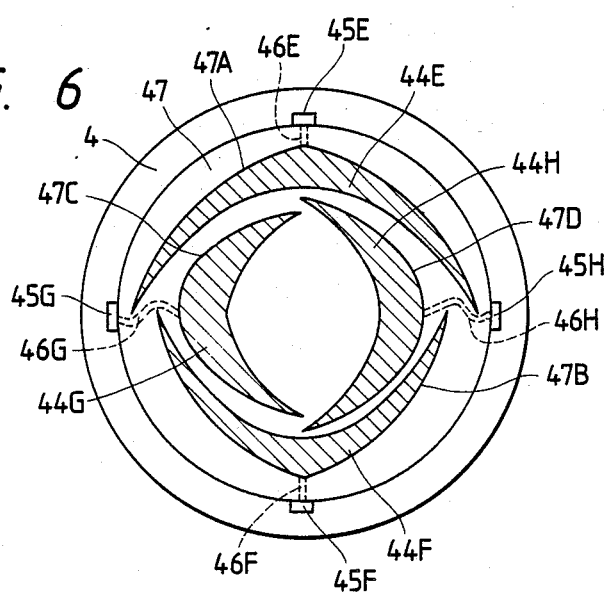
FIG. 6 is a view of an alternative embodiment of the light receiving disk and light receiving portions known in the art.

The embodiments shown in FIGS. 1–3 illustrate portions of a photoelectric conversion-type rotational position indicator in which the output to be achieved comprises four sinusoidal waves 90 degrees out of phase from one another.

A light shielding member 3, as mentioned above, is interposed between the light emitting member (not shown) and light receiving member 4. Light shielding member 3 is shown alone in FIG. 1(b), and shown in operable position relative to light receiving member 4 in FIG. 1(a). The light shielding member 3 is operably connected to a rotating body (not shown) for which it is desired to measure the rotational position.

Light shielding member 3 includes m windows 32, wherein m is defined above. Thus, in the embodiments shown in FIGS. 1-3, m=1. When a plurality (m>1) of windows 31 are employed, they are configured on light shielding member 3 so that the windows 32 are not superimposed on each other when viewed radially from the center of light shielding member 3.

Windows 32 in light shielding member 3 permit light from the light emitting member (not shown) to pass through light shielding member 3 to light receiving member 4, illuminating light receiving portions 44. The material from which light receiving portions 44 are composed produces an electric current or voltage varying in proportion to the area of each light receiving portion 44 exposed. Windows 32 are therefore shaped to expose an area of light receiving portions 44 varying sinusoidally, thereby producing a signal current $I_{sc}$ also varying sinusoidally.

Referring now to FIG. 1(b), windows 32 are formed in the shape just described, to lie inside an area bounded by two concentric circles having radii $r_3$ and $r_4$, such that $r_1 \leq r_3 > r_4 \leq r_2$. Further, the arc of those concentric circles of radii $r_3$ and $r_4$, in which each window 32 is contained, is measured angularly by the angle b, according to Formulas (II) and (III):

$$(360/m) - a \leq b \leq (360/m) \quad \text{(II)}$$

$$a \leq b \quad \text{(III)},$$

such that Formulas (I) (above), II and (III are satisfied simultaneously. Formulas (II) and (III) set the conditions for varying the output of the light receiving portions with the rotation of the light shielding member.

With the conditions of Formulas (I)–(III) satisfied, the $I_{sc}$ outputs of light receiving portions 44 are of the same phase, for every n light receiving portions as counted circumferentially. Thus, it is desirable that the $I_{sc}$ outputs are obtained by connecting every nth light receiving portion 44 (producing an output signal $I_{sc}$ of identical phase) by connecting means, the connection being in parallel or in series. Such connecting means may be, preferably but not exclusively, conducting material which is of the same composition as the light receiving portion (i.e., amorphous silicon). The amplitude of the output signal is amplified m times as compared to the output signal of a single light receiving portion, as a result of the connecting means.

The photoelectric conversion-type rotational position indicator has several advantages over those previously known. As a result of the identical configurations of each light receiving portion, output signal levels and other electrical characteristics are equalized for all light receiving portions.

Another advantage lies in the elimination of the need to insert conductors in spaces between light receiving portions. This results in an increase in the effective area of each light receiving portion of the light receiving member, and a corresponding decrease in the ineffective area of each light receiving portion. Miniaturization proportional to this decrease may be obtained as a result of the present invention.

As a result of the configuration of light receiving portions 44 on the light receiving member 4, the lengths and configurations of all conductors 46 may be equalized. This results in a uniform impedance for all conductors 46. Additionally, the conductors are placed outside of areas of the light receiving member 4 which are exposed to light passing through windows 32 of light shielding member 3, making the metal mask employed in known rotational position indicators unnecessary. Finally, since no constraints on the configuration and number of light receiving portions 44 result from the necessity of spacing to permit placement of conductors 46, the number of phases differentiated output signals may be increased as a result.

If the signals produced by the embodiment disclosed in FIGS. 1(a)–(c) are viewed as two phases separated by 90 degrees, two sine waves each having positive and negative bipolar amplitudes with respect to zero may be obtained by taking the differences in output between light receiving portions 44A and 44C, and between light receiving portions 44B and 44D. Thus, twice as many light receiving portions 44 as are needed to obtain multiple phased outputs may desirably be provided, with sine waves that deflect to two positive and negative poles resulting from taking the differences between light receiving portions 44 which are symmetrically disposed about the center of the light receiving member. The number of phases which are needed for a particular application is p, and therefore n=2p in the case described. Moreover, it is observed that any phase offset in the output from which the differences are obtained has no net effect, since those offsets are compensated for in the process of obtaining the difference. Embodiments of this type are illustrated in FIGS. 2 and 3.

The light receiving portions of FIGS. 2 and 3 are configured as in FIG. 1. In FIG. 2, window 33 of light shielding member 3 is configured according to Formulas (I)–(III). Additionally, the external (as viewed from the center of light shielding member 3) curve of window 32 lies on circle of radius $r_3$ concentric with light shielding member 3, with $r_3 \leq r_1$. The inner curve of window 33 in part overlaps a second concentric circle of radius $r_5$ (shown in FIG. 2(b) by the dashed line), with the remainder deviating therefrom toward the center of light shielding member 3. The shape of window 33 is such that the area of each light receiving portion 44 exposed through window 34 varies sinusoidally as light shielding member 3 rotates through $(360/(m \times n))$ degrees. It is observed that the region bounded by concentric circles of radii $r_3$ and $r_5$ lies entirely within window 33 in this embodiment.

In the embodiment shown in FIG. 3, window 34 is placed such that its inside curve lies along a circle concentric with light shielding member 3, having radius $r_6$, with $r_6 \geq r_2$. The outside curve of window 34 is placed so that it lies in part on a second concentric circle of radius $r_4$ (shown in FIG. 3(b) by the dashed line) and the remainder deviating outwardly therefrom toward the periphery of light shielding member 3. The shape of window 34 is such that the area of each light receiving portion 44 exposed through window 34 varies sinusoidally as light shielding member 3 rotates through $(360/(m \times n))$ degrees. It is observed that the region bounded by concentric circles of radii $r_4$ and $r_6$ lies entirely within window 34 in this embodiment.

In the embodiments shown in FIGS. 2 and 3, a signal of known offset from the sine waves produced by the embodiment of FIG. 1 is added to the outputs of the respective light receiving portions. This signal is the result of the portion of the window lying between $r_3$ and $r_5$ (in FIG. 2) or between $r_4$ and $r_6$ (in FIG. 3). The effect of this additional offset can be negated by obtaining the difference between signals generated by symmetrically disposed light receiving portions as discussed above. The advantage of the embodiments shown in FIGS. 2 and 3 is that no acute angle is formed in the window, causing configuration of the window to be more accurate and resulting in output signals closer to true sine waves than possible in the prior art. This difference may also be usefully obtained in the embodiment shown in FIG. 1.

Although the present invention has been described in terms of specific embodiments and examples, it will be apparent to one skilled in the art that various modifications may be made to those embodiments without departing from the scope of the appended claims and their equivalents. Accordingly, the present invention should not be construed to be limited to the specific embodiments or examples disclosed herein.

What is claimed is:

1. A photoelectric conversion-type rotational position indicator for indicating the rotational position of a rotating body measuring light received from a fixed disposed light emitting member, comprising:

a light receiving member fixedly disposed opposite the light emitting member, said light receiving member including $m \times n$ identically shaped light receiving portions made from a photoelectric converting material at predetermined spacings on the light receiving member, to generate n sinusoidal signals $(360/(m \times n))$ degrees out of phase from each other, where m is a positive, non-zero integer equal to the number of sinusoidal signal cycles generated per revolution of a light shielding member, and n is a positive, non-zero integer equal to the number of phase separated sinusoidal signals to be generated by the light receiving portions, the identically shaped light receiving portions being disposed between a first set of two concentric circles having radii $r_1$ and $r_2$ on the light receiving member and divided circumferentially therein, the first set of circles being coaxial with the light receiving member;

a light shielding member coaxially interposed between the light emitting member and said light receiving member and being operably connected to the rotating body such that the light shielding member rotates with the rotating body, the light shielding member having m windows disposed in a region between a second set of two concentric circles having radii $r_3$ and $r_4$, such that $r_1 \geq r_3 > r_2 \leq r_4$, the second set of circles being coaxial with the light shielding member, the windows not being superimposed upon one another when viewed in a radial direction from the center of the light shielding member, each of the windows being shaped with an inner curve and an outer curve such that the visible area of each light receiving portion through each of the windows varies in a sinusoidal form of one cycle as the light shielding member rotates through $(2360/M)$ degrees; and, means for obtaining the phase separated sinusoidal signals by connecting n groups of m light receiving portions in parallel or series.

2. The photoelectric conversion-type rotational position indicator of claim 1, wherein p is a positive, non-zero integer equal to the number of phase separated sinusoidal signals needed to be generated by the light receiving portions, and wherein $n=2p$, and a difference signal is obtained between the sinusoidal signal generated by a light receiving portion and the sinusoidal signal generated by another light receiving portion symmetrically disposed on said light receiving member.

3. The photoelectric conversion-type rotational position indicator of claim 1, wherein an outer curve of a window formed in the light shielding member is a circle of radius $r_3$, and a region encircled by two concentric circles having radii $r_3$ and $r_5$ lies wholly within the window, and wherein $r_3$ is greater than $r_5$ and $r_5$ is less than or equal to $r_1$.

4. The photoelectric conversion-type rotational position indicator of claim 2, wherein the outer curve of a window formed in the light shielding member is a circle of radius $r_3$, and a region encirlced by two concentric circles having radii $r_3$ and $r_5$ lies wholly within the window, and wherein $r_3$ is greater than $r_3$ and $r_5$ is less than or equal to $r_1$.

5. The photoelectric conversion-type rotational position indicator of claim 1, wherein the inner curve of a window formed in the light shielding member is a circle having a radius $r_4$, and a region encircled by two concentric circles having radii $r_4$ and $r_6$ lies wholly within the window, and wherein $r_4$ is greater than $r_6$ and $r_6$ is greater than or equal to $r_2$.

6. The photoelectric conversion-type rotational position indicator of claim 2, wherein the inner curve of a window formed in the light shielding member is a circle having a radius $r_4$, and a region encircled by two concentric circles having radii $r_4$ and $r_6$ lies wholly within the window, and wherein $r_4$ is greater than $r_6$ and $r_6$ is greater than or equal to $r_2$.

* * * * *

UNITED STATES PATENT AND TRADEMARK OFFICE
CERTIFICATE OF CORRECTION

PATENT NO. : 4,902,885
DATED : February 20, 1990
INVENTOR(S) : Yoshikazu Kojima et al.

It is certified that error appears in the above-identified patent and that said Letters Patent is hereby corrected as shown below:

Column 5, line 27,

"$r_1 \leq r_3 > r_4 \leq r_2$" should read --$r_1 \geq r_3 > r_4 \geq r_2$--.

Claim 1, Column 7, Line 53, "<4" should be

"$\leq r_4$" should read --$\geq r_4$--.

Claim 1, Column 8, Line 8, "(2360/M)" should be --(360/M)--.

Signed and Sealed this

Twenty-second Day of December, 1992

Attest:

DOUGLAS B. COMER

Attesting Officer    Acting Commissioner of Patents and Trademarks